No. 895,795. PATENTED AUG. 11, 1908.
E. F. SAMPSON.
SPRAYING APPARATUS.
APPLICATION FILED MAY 24, 1907.
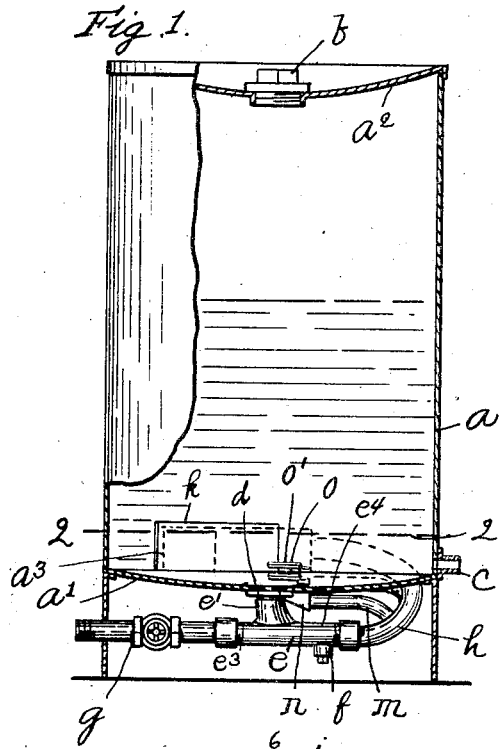
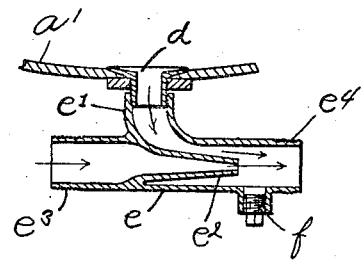
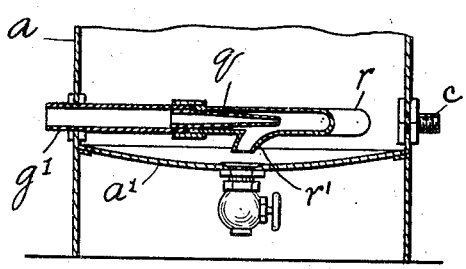
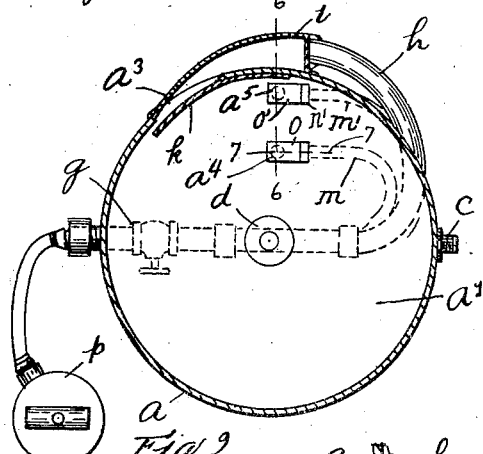
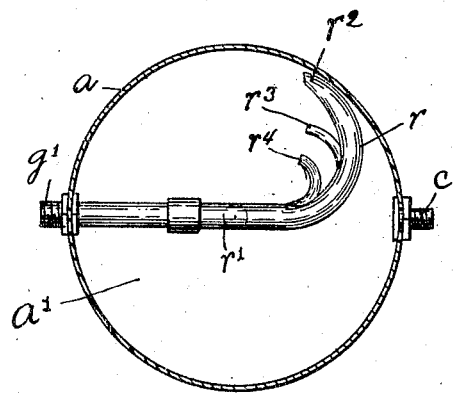
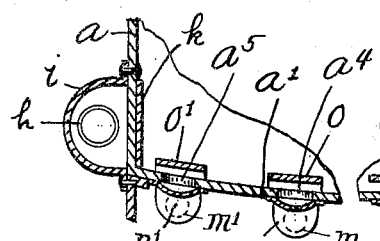
Witnesses:
H. B. Davis.
E. F. Burns.
Inventor:
Emerson F. Sampson
by Nogel Namman
Attys

UNITED STATES PATENT OFFICE.

EMERSON F. SAMPSON, OF PLYMOUTH, MASSACHUSETTS.

SPRAYING APPARATUS.

No. 895,795.     Specification of Letters Patent.     Patented Aug. 11, 1908.

Application filed May 24, 1907. Serial No. 375,440.

*To all whom it may concern:*

Be it known that I, EMERSON F. SAMPSON, of Plymouth, county of Plymouth, State of Massachusetts, have invented an Improvement in Spraying Apparatus, of which the following description, in connection with the accompanying drawings, is a specification, like characters on the drawings representing like parts.

In spraying trees and other vegetation with poisoned water, it is customary to mix the poisoning material and water in a tank from which the mixture is either forced by compressed air or is pumped with an ordinary force pump. In these devices much difficulty is encountered in preventing the poisoning matter, which is of greater specific gravity than the water, from settling to the bottom of the tank, as it will do, unless the contents of the tank are violently agitated at all times. In order to maintain a mixture of water and poisoning material of the desired proportions various devices for mechanically agitating the mixture have been employed which require the expenditure of considerable power and which, moreover, are not as effective as desired, for the reason that usually a thick layer of the poisoning material becomes deposited on the bottom of the tank before it is emptied.

The object of my invention is to provide a tank, of the character above referred to, with means whereby the contents of the tank will be constantly stirred and prevented from settling on the bottom during the time when the liquid is being discharged from the tank, without the employment of mechanical mixing devices.

For an understanding of the means which I employ in carrying out my invention reference is made to the accompanying drawing, in which, Figure 1 is a side elevation, partly in central section, of a compressed air tank provided with my invention. Fig. 2 is a horizontal sectional view on the line 2—2 of Fig. 1. Fig. 3 is an enlarged detail vertical sectional view of the injector mechanism. Fig. 4 is a detail sectional view of a modified form of my invention. Fig. 5 is a plan view of the devices shown in Fig. 4. Figs. 6 and 7 are detail sectional views on the lines 6—6 and 7—7, respectively of Fig. 2.

The tank $a$, which I preferably employ is cylindrical in form, or is provided with curved walls, so that a whirling motion or circular flow of the liquid therein may be easily caused and maintained, and is also provided with a concave bottom $a'$, so that the lowest point in the tank is at the center thereof. An air-tight top $a^2$ is provided on said tank, said top being provided with a central opening and being preferably concave, as shown, to enable the tank to be readily filled, said opening being adapted to be tightly closed by a screw plug $b$. A discharge pipe $c$ is connected to the tank adjacent its bottom so that it will always be below the liquid level in the tank, and the bottom $a'$ of the tank is provided with a central outlet opening at its lowest point, in which a nipple $d$ is secured. The flange of said nipple is preferably flush with the inner surface of the bottom, so that the tank may be completely drained therethrough, and there will be nothing to impede the downward flow thereto.

An injector $e$, comprising an inlet branch $e'$, a nozzle $e^2$, an air supply branch $e^3$ and a discharge branch $e^4$, is provided, said branch $e'$ being connected to the nipple $d$, and said branch $e^3$ being connected to an air supply pipe $g$, and leading into the nozzle $e^2$, which extends past the branch $e'$ into the discharge branch $e^4$. A drain plug $f$ is preferably provided in the under side of the ejector, as shown, for cleaning purposes. A circulating or discharge pipe $h$ is connected at one end to the discharge branch $e^4$, and is extended beneath the bottom of the tank up to the side thereof in a gradual curve, where it is connected at its other end to one end of a chamber $i$, which is secured to the outer side or wall of the tank. The outer side of said chamber $i$ tapers gradually from the end to which pipe $h$ is connected to the side of the tank and a port or opening $a^3$ is provided in the wall of the tank adjacent the point of connection of said side with the tank. A deflector plate $k$ is connected to the inner wall of the tank adjacent said port $a^3$ and extends over said port in a direction approximately parallel to and at a short distance from the wall, as shown in Fig. 2, so that water discharged from the chamber $i$ into the tank will be projected therein tangentially, said deflector plate being so disposed that it does not interfere with a circular whirling motion of the liquid in the tank. Under some conditions it is desirable to provide one or more branch pipes which lead from the pipe $h$ to the bottom of the tank. As indicated in Figs. 2 and 6, I provide two branch pipes $m$ and $m'$ which lead from pipe $h$ to chambers $n$, $n'$, respectively, said chambers being similar in construction to chamber $i$ and secured to the under side of the tank in substantially the same manner as said chamber $i$ is secured to the side. In like manner said chambers $n$, $n'$ are respectively connected to the tank through ports $a^4$, $a^5$, in the bottom thereof, deflectors $o$, $o'$ being respectively mounted on the tank bottom and extending over said openings in the direction of the bottom so as to direct the jets therefrom along the bottom of the tank. The port $a^4$ is shown as located approximately midway between the center of the bottom of the tank and the side wall and the port $a^5$ closely adjacent said wall.

In operation the tank is partly filled with water and the poisoning material and is then hermetically closed. An air pump $p$, or other means for supplying air under pressure, is connected to the pipe $g$ and air is rapidly forced through said pipe and the nozzle $e^2$. Acting on the principle of the ordinary injector, this air jet will act to draw the liquid from the tank through the inlet branch $e'$ and force the same along through the pipe $h$ up into the chamber $i$ whence it will be discharged, with the air, through the port $a^3$ back into the tank. The jet of liquid and air which will be forced through the port $a^3$ will be directed into the tank tangentially, by the deflector $k$, causing the liquid therein to whirl or move circularly. This whirling motion prevents to a great extent, the settling of the poisoning material in the tank upon the bottom. In addition to the circular current thus produced, the jet, which is delivered from the opening $a^3$ will have a scouring action upon the bottom, tending further to prevent settling of the heavy material. At the same time there will be a flow from the walls to the center of the tank, on account of the fact that the liquid will be constantly drawn in through the port in the middle thereof, so that the liquid will, therefore, circulate spirally. Moreover, as the bottom of the tank is inclined towards the center, the heavier matter, which settles on the bottom, will gravitate towards the center, this gravitation being materially assisted by the cross current which is thus created, with the result that the matter which settles on the bottom will be conducted into the injector and will be carried around through the pipe $h$ and discharged back into the tank. The result is that a constant agitation and circulation of the liquid in the tank is secured which tends to cause the poisoning material to be uniformly distributed or held in suspension in the liquid, and to prevent the settling of the heavier matter on the bottom.

The jets from the ports $a^4$, $a^5$ act to accelerate the flow between the walls and center and also aid in scouring the bottom of the tank.

While I have shown a main discharge passage from the injector in the wall, and two others in the bottom, the precise number and location of said passages depend largely on conditions such as size of tank and force and rapidity of the air supply. Under some conditions it may be found desirable to employ only one discharge passage and to have that located in the bottom near the side wall, as indicated by port $a^5$ and chamber $n'$. The exact direction in which the jets shall be projected is also a matter of expediency to some extent, for, although they should act to cause a constant circulation of the liquid under all conditions, the direction of a jet inwardly would aid in washing the heavier material into the middle outlet.

In Figs. 4 and 5 I show a modified form of my invention in which the circulating pipe is wholly within the tank. In this form the air inlet pipe $q'$ leads through the side wall of the tank and is connected to a nozzle $q$ which is inserted in the end of a circulating pipe $r$, said pipe having a branch or inlet pipe $r'$ extending downwardly therefrom to a point adjacent the bottom of the tank near the middle thereof, and said nozzle extending past the point where said branch leads into the main pipe, as in the ordinary injector. Said pipe $r$ is extended to the wall of the tank in a curved direction and is provided with a nozzle $r^2$ at its end which is disposed to direct the jet therefrom circularly of the tank. Branches $r^3$ and $r^4$ may also be provided in the pipe $r$, as shown in Fig. 5. The operation of this form of my invention is substantially the same as that already described, air under pressure being forced through the nozzle $q$ and causing the liquid in the tank to be drawn in through the branch $r'$ and discharged through the nozzle $r^2$ and the branch nozzles $r^3$ and $r^4$, creating a whirling motion of the liquid in the tank and preventing the heavier material from settling to the bottom thereof by said whirling motion and the scouring action of the jets on the tank bottom. While this form of my invention is less expensive of construction than the other form, it is less effective in operation, as the pipes in the tank impede the whirling motion and the heavier matter which settles to the bottom is drawn into the circulating pipe less effectively.

Having thus described my invention, what I claim as new and desire to secure by Letters Patent is:—

1. A compressed-air, spraying tank comprising a circulating pipe in open communication with said tank at different points, a nozzle disposed to direct a jet through the pipe, and means for forcing air under pressure through said nozzle to draw the liquid of the tank into said pipe at one of said points and discharge it at the other and to raise or maintain the air pressure in the tank, substantially as described.

2. In combination with a tank having curved side walls to permit unobstructed, circular flow therein, and having a circulating passage connected at each end to said tank and arranged to conduct the liquid in the tank from the middle towards the walls and discharge the same in a direction to cause a circular flow in the tank, and means for forcing the liquid through said passage to cause said circular flow and a return flow from the walls to the middle, substantially as described.

3. In combination with a circular tank, mixing means therefor comprising means for drawing the liquid from the tank at one point and discharging it thereinto at another point in a direction to cause a circular motion of the liquid therein, said point of withdrawal being located centrally of the tank and the point of discharge being adjacent the walls thereof, so that the liquid is caused to circulate spirally within the tank substantially as described.

4. In combination with a circular tank having its bottom inclined to the central portion thereof, means for drawing the liquid from the tank at a point adjacent the lowest portion therein and discharging it back into the tank adjacent the bottom and walls and in a direction to cause a circular motion of the liquid in the tank, substantially as described.

5. A compressed-air, spraying tank comprising a circulating pipe connected to said tank at different points, a nozzle leading into said circulating pipe adjacent one end and disposed to direct a jet through the pipe towards the other end, and means for forcing air under pressure through said nozzle to cause a circulation through said pipe and to raise or maintain the air pressure in the tank, substantially as described.

6. A compressed-air, spraying tank comprising an injector disposed to draw liquid from the tank at a point adjacent its bottom, a pipe leading from said injector and discharging into the tank in a direction to cause a circular flow therein and means for conducting air under pressure into said injector, substantially as described.

7. In combination with a circular tank, means for drawing the liquid therein from the middle portion thereof and forcing it back into the tank at a point between the central portion and wall and adjacent the bottom thereof in a direction circularly of the tank to cause a circular and inward flow of the liquid, substantially as described.

8. In combination with a tank having a circulating pipe connected thereto at points adjacent the center of its bottom and its side, a nozzle extended into said pipe in a direction to cause a fluid jet discharged therethrough to draw the liquid from the middle of the tank into said pipe and return it to the tank at the side thereof, and means at the discharge end of the pipe for directing the flow along the bottom of the tank in a direction to cause a circular flow of the liquid therein, substantially as described.

In testimony whereof, I have signed my name to this specification, in the presence of two subscribing witnesses.

EMERSON F. SAMPSON.

Witnesses:
B. A. HATHAWAY,
THOS. L. CASSIDY.